United States Patent [19]

Saccone

[11] Patent Number: 5,664,804
[45] Date of Patent: Sep. 9, 1997

[54] PRESSURE VESSEL WITH RUPTURABLE CLOSURE WALL

[75] Inventor: Paul T. Saccone, Rochester Hills, Mich.

[73] Assignee: TRW Vehicle Safety Systems Inc., Lyndhurst, Ohio

[21] Appl. No.: 629,372

[22] Filed: Apr. 8, 1996

[51] Int. Cl.[6] .................................................. B60R 21/26
[52] U.S. Cl. ..................... 280/737; 137/68.13; 137/68.3; 222/5
[58] Field of Search ............................... 280/737, 741, 280/736, 740; 137/68.13, 68.3, 68.19, 68.21, 68.23, 68.25; 222/5, 3

[56] References Cited

U.S. PATENT DOCUMENTS

| | | | |
|---|---|---|---|
| 2,599,593 | 6/1952 | Stroop | 137/68.21 |
| 5,195,777 | 3/1993 | Cuevas | 280/736 |
| 5,242,194 | 9/1993 | Popek | 280/737 |
| 5,273,312 | 12/1993 | Coultas et al. | 280/737 |
| 5,348,344 | 9/1994 | Blumenthal et al. | 280/737 |
| 5,350,192 | 9/1994 | Blumenthal | 280/737 |
| 5,454,592 | 10/1995 | Blumenthal et al. | 280/737 |
| 5,464,247 | 11/1995 | Rizzi et al. | 280/737 |

OTHER PUBLICATIONS

Copending U.S. Patent Application Serial No. 08/583,314, filed Jan. 5, 1996, entitled Apparatus for Inflating an Inflatable Vehicle Occupant Protection Device, assigned to TRW Vehicle Safety Systems Inc.

*Primary Examiner*—Brian L. Johnson
*Assistant Examiner*—Peter C. English
*Attorney, Agent, or Firm*—Tarolli, Sundheim, Covell, Tummino & Szabo

[57] ABSTRACT

A pressure vessel (10) includes a tank (12) and a closure structure (14) with a breakaway part (90) exposed to fluid pressure in the tank (12). The breakaway part (90) is severable from the closure structure (14) for movement outward from the tank (12) under the influence of elevated fluid pressure. The pressure vessel (10) further includes a probe (144) which moves forcefully against and through the closure structure (14) to puncture a hole (210) through the breakaway part (90). The probe (144) guides the breakaway part (90) to move outward from the tank (12) telescopically over the probe (144) under the influence of the elevated fluid pressure.

11 Claims, 5 Drawing Sheets

PRESSURE VESSEL WITH RUPTURABLE CLOSURE WALL

FIELD OF THE INVENTION

The present invention relates to a pressure vessel for containing fluid under pressure, and particularly relates to a pressure vessel with a rupturable closure wall.

BACKGROUND OF THE INVENTION

A pressure vessel for containing fluid under pressure may include a tank and a plug with a rupturable closure wall. In such a pressure vessel, the plug is fixed and sealed to an outlet portion of the tank to close the tank. The plug supports the closure wall in a position in which the closure wall blocks the fluid from flowing outward from the tank. Additionally, the plug may be constructed as an outlet manifold with a fluid flow conduit extending from the closure wall to a plurality of outlet openings.

The closure wall is ruptured when the fluid is to be released from the pressure vessel. As known in the art, the closure wall may be ruptured by fluid pressure forces acting outward against the closure wall, or by the impact of a piston or the like. The fluid then flows outward from the tank past the ruptured closure wall and into the plug, and further outward through the conduit and the outlet openings in the plug. In some cases, a predefined breakaway part becomes severed from the closure wall when the closure wall is ruptured. The breakaway part may be carried outward into the conduit by the fluid flowing outward from the tank.

SUMMARY OF THE INVENTION

In accordance with the present invention, an apparatus comprises a tank and a closure structure with a breakaway part exposed to fluid pressure in the tank. The breakaway part is severable from the closure structure for movement outward from the tank under the influence of elevated fluid pressure. The apparatus further comprises a probe which is movable forcefully against and through the closure structure so as to puncture a hole through the breakaway part. The probe guides the breakaway part to move outward from the tank telescopically over the probe under the influence of the elevated fluid pressure.

In a preferred embodiment of the present invention, the apparatus has an outlet manifold with a conduit for directing the fluid to flow outward from the tank. The probe is supported for longitudinal movement in a cylinder which is located in the conduit, and projects longitudinally through an end wall of the cylinder. In this arrangement, the probe guides the breakaway part of the closure structure to move into the conduit toward and against the end wall of the cylinder. The probe and the cylinder thus cooperate to capture the breakaway part at a predetermined location in the conduit. This prevents the breakaway part from obstructing the flow of fluid moving outward through the conduit.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 1:
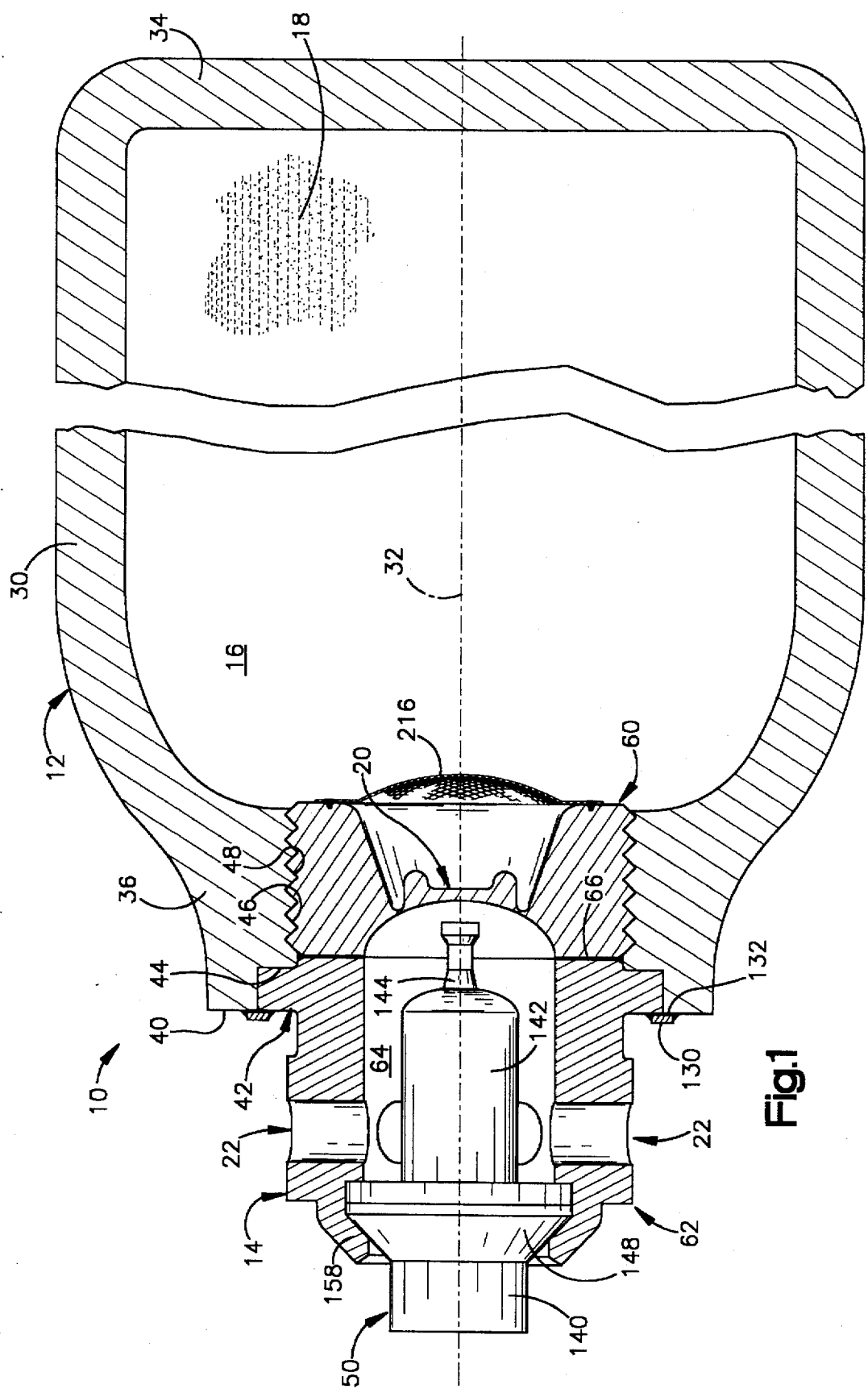
FIG. 1 is a view of an apparatus comprising a pressure vessel constructed in accordance with the present invention.

A pressure vessel 10 comprising a preferred embodiment of the present invention is shown in FIG. 1. The pressure vessel 10 includes a tank 12, which is sometimes referred to as a bottle, and an end plug 14 which closes the tank 12. The tank 12 has a storage chamber 16 containing fluid 18 under pressure. The end plug 14 has a rupturable closure wall 20. The closure wall 20 is exposed to the pressure in the storage chamber 16, and blocks the fluid 18 from flowing out of the storage chamber 16. When the pressure vessel 10 is opened, the closure wall 20 is ruptured and the fluid 18 is released to flow out of the storage chamber 16 past the closure wall 20. The fluid 18 then flows outward through the end plug 14 and further outward from the pressure vessel 10 through a plurality of outlet openings 22 in the end plug 14.

In the preferred embodiment of the present invention shown in the drawings, the tank 12 has an elongated cylindrical body wall 30 with a longitudinal central axis 32. The tank 12 further has a circular end wall 34 at one end of the body wall 30 and a tapered, tubular neck 36 at the opposite end of the body wall 30.

An annular end surface 40 of the neck 36 defines a circular tank opening 42 which is centered on the axis 32. An annular shoulder surface 44 of the neck 36 is concentric with, and recessed axially from, the end surface 40. A cylindrical inner surface 46 of the neck 36 also is centered on the axis 32. The cylindrical inner surface 46 extends axially inward from the shoulder surface 44 to the storage chamber 16, and has a screw thread 48. The tank 12 is preferably formed of a material which is comprised at least substantially of aluminum, i.e., aluminum or an aluminum alloy, for low weight and cost.

The fluid 18 contained under pressure in the storage chamber 16 may comprise, for example, inflation fluid for inflating an inflatable device. In the preferred embodiment of the present invention, the fluid 18 comprises inflation fluid for inflating a particular type of inflatable vehicle occupant protection device (not shown) which is commonly referred to as an air bag. Specifically, the inflation fluid comprises combustible fluid. The combustible fluid may have any suitable composition known in the art, but most preferably comprises a combustible mixture of gases including a fuel gas, an oxidizer gas, and an inert gas in accordance with the invention set forth in U.S. Pat. No. 5,348,344, assigned to TRW Vehicle Safety Systems Inc. The combustible mixture of gases 18 is preferably contained in the storage chamber 16 at a storage pressure within the range of approximately 1500 psi to approximately 5000 psi.

The end plug 14 has a generally cylindrical shape, and is received coaxially within the tank opening 42 to close the tank 12. Additionally, the end plug 14 supports an initiator assembly 50 in a position centered on the axis 32 of the tank 12. As described fully below, the initiator assembly 50 functions to open the pressure vessel 10 to initiate a pressurized flow of the combustible mixture of gases 18 from the storage chamber 16. The initiator assembly 50 also functions to ignite the combustible mixture of gases 18 in the storage chamber 16. As a result, the fluid pressure inside the storage chamber 16, and hence the flow rate outward from the storage chamber 16, is increased by heat generated upon combustion of the mixture of gases 18.

As shown in FIG. 1, the end plug 14 includes first and second plug parts 60 and 62. The first plug part 60 includes the closure wall 20, and is preferably formed of steel for higher resistance to creep under stress induced in the closure wall 20 by the fluid pressure in the storage chamber 16. Additionally, the first plug part 60 is most preferably formed of stainless steel for higher resistance to melting and oxidation under the influence of the heat generated by combustion of the mixture of gases 18.

The second plug part 62 is constructed as an outlet manifold with a fluid flow conduit 64 communicating the closure wall 20 with the outlet openings 22. Like the tank 12, the second plug part 62 is preferably formed of material which is comprised at least substantially of aluminum. The second plug part 62 is thus lighter and less costly than if it were formed of steel. A friction weld 66 fixes the first and second plug parts 60 and 62 to each other.

Figure 2:
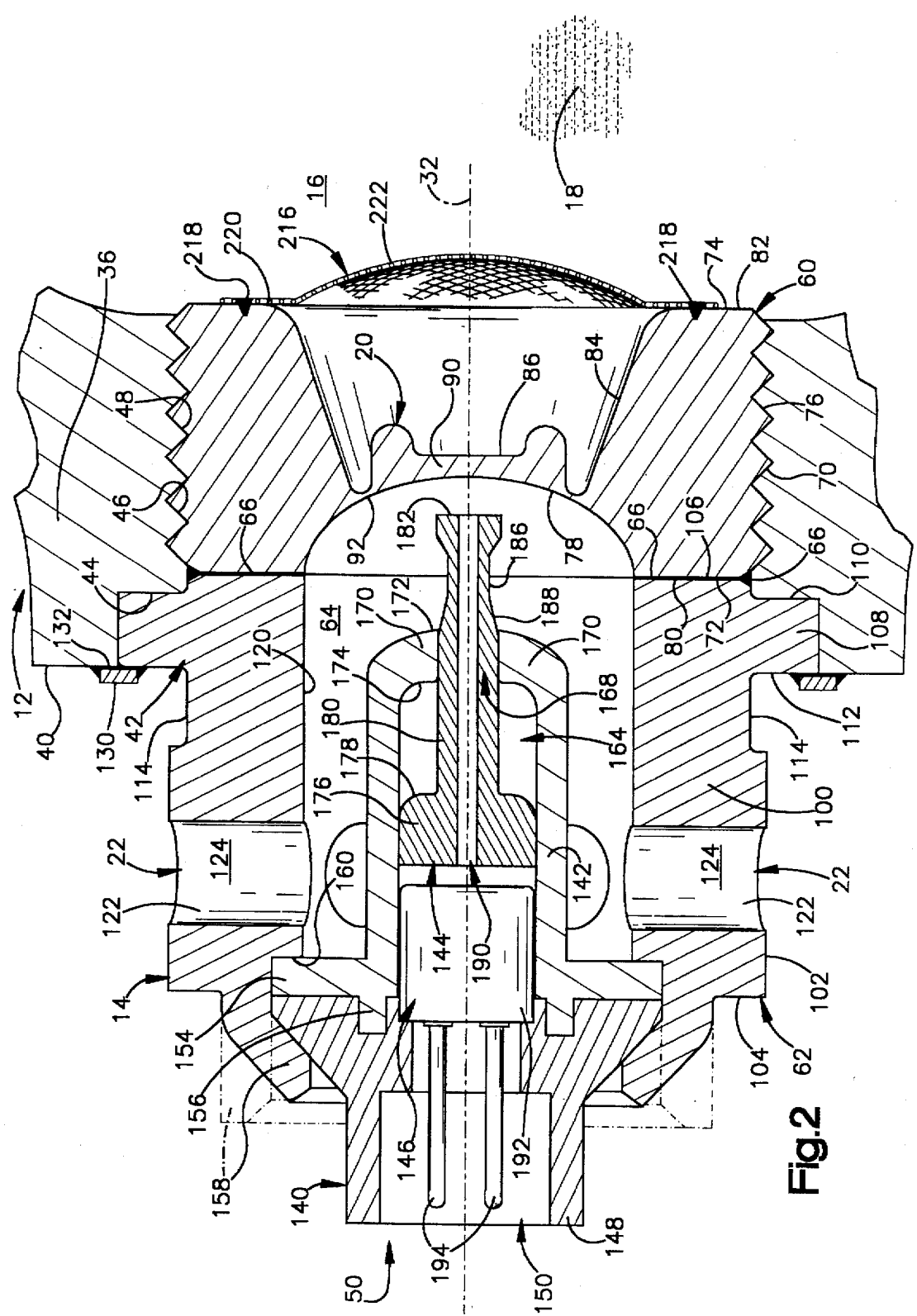
FIG. 2 is an enlarged partial view of the apparatus of FIG. 1.

As shown in the enlarged view of FIG. 2, the first plug part 60 has a cylindrical peripheral surface 70, an outer end surface 72, and an inner end surface 74. The peripheral surface 70 has a screw thread 76 engaged with the screw thread 48 on the neck 36 of the bottle 12. The outer end surface 72 has a concave, circular central portion 78 extending diametrically across the axis 32. The outer end surface 72 further has a planar, annular peripheral portion 80. The peripheral portion 80 is perpendicular to the axis 32, and extends radially outward from the central portion 78 to the screw thread 76. The first plug part 60 thus has a short cylindrical shape that does not project axially outward beyond the concave central surface portion 78. This structural feature helps to minimize the length of the first plug part 60 so that the weight and cost of the steel are minimized accordingly.

The inner end surface 74 of the first plug part 60 similarly has a planar, annular peripheral portion 82 perpendicular to the axis 32. The inner end surface 74 further has a frustoconical intermediate portion 84 which is tapered radially inward from the peripheral portion 82. A central portion 86 of the inner end surface 74 is bounded by the intermediate portion 84, and also extends across the axis 32. The closure wall 20 is defined by the stainless steel material of the first plug part 60 which is located axially between the central portions 78 and 86 of the inner and outer end surfaces 72 and 74.

More specifically, the closure wall 20 extends diametrically across the axis 32 at the center of the first plug part 60, and has a disk-shaped central portion 90 bounded by a thin, annular peripheral portion 92. The peripheral portion 92 of the closure wall 20 is constructed as a stress riser which is rupturable under the influence of a predetermined elevated fluid pressure acting outward against the closure wall 20 from the storage chamber 16. Accordingly, the central portion 90 of the closure wall 20 is constructed as a predefined breakaway part which becomes severed from the peripheral portion 92 upon rupturing of the peripheral portion 92.

With further reference to FIG. 2, the second plug part 62 has a tubular body portion 100 with a cylindrical outer surface 102 centered on the axis 32. The body portion 100 of the second plug part 62 further has an annular outer end surface 104 and an annular inner end surface 106, each of which is planar and perpendicular to the axis 32. The inner end surface 106 of the second plug part 62 abuts the outer end surface 72 of the first plug part 60 at the peripheral portion 80 of the outer end surface 72.

A ring-shaped flange 108 projects radially outward from the body portion 100 of the second plug part 62 at a location spaced a short distance axially from the inner end surface 106. The flange 108 has annular inner and outer side surfaces 110 and 112 which are planar and perpendicular to the axis 32. A plurality of planar outer surfaces 114, two of which are shown in the sectional view of FIG. 2, define a corresponding plurality of wrench flats on the body portion 100 of the second plug part 62 adjacent to the flange 108. Although the wrench flats 114 are located on the second plug part 62, the second plug part 62 is free of an external screw thread like the external screw thread 76 on the first plug part 60.

The second plug part 62 further has a major cylindrical inner surface 120 and a plurality of minor cylindrical inner surfaces 122. The major cylindrical inner surface 120 is centered on the axis 32, and defines the conduit 64. The minor cylindrical inner surfaces 122 extend radially outward from the major cylindrical inner surface 120, and define a corresponding plurality of outlet passages 124 which communicate the conduit 64 with the outlet openings 22. Preferably, the cylindrical inner surfaces 120 and 122 are anodized for increased resistance to oxidation under the influence of the heat generated by combustion of the combustible mixture of gases 18. The cylindrical outer surface 102 may also be anodized adjacent to the outlet openings 22.

As noted above, the first and second plug parts 60 and 62 are fixed to each other by the friction weld 66. The friction weld 66 is formed between the first and second plug parts 60 and 62 where the inner end surface 106 of the second plug part 62 abuts the outer end surface 72 of the first plug part 60. The first and second plug parts 60 and 62 are interconnected in this manner before the end plug 14 is installed in the neck 36 of the tank 12. Accordingly, the end plug 14 is installed in the neck 36 of the tank 12 by screwing the first plug part 60 into the neck 36 until the flange 108 on the second plug part 62 moves axially against the neck 36. The inner side surface 110 of the flange 108 then abuts the shoulder surface 44 in the neck 36.

When the end plug 14 has been moved fully into the neck 36 of the tank 12 in the foregoing manner, the outer side surface 112 of the flange 108 adjoins, and is coplanar with, the end surface 40 of the neck 36. The end plug 14 is then connected to the neck 36 by a weld ring 130 and an associated friction weld 132. The weld ring 130 overlies both of the adjoining, coplanar surfaces 112 and 40 so as to extend radially across the juncture of those surfaces circumferentially entirely around the axis 32. The friction weld 132 is formed between the weld ring 130 and the adjoining surfaces 112 and 40 so that the end plug 14 is fixed and sealed to the neck 36 of the tank 12 entirely around the axis 32.

The end plug 14 may further include an inlet structure (not shown) for filling the tank 12 with the combustible mixture of gases 18, or other fluid, to be contained under pressure in the storage chamber 16. As known in the art, such an inlet structure may comprise a check valve in an inlet passage extending through the end plug 14.

The fluid pressure in the storage chamber 16 urges the end plug 14 to move axially outward from the neck 36 of the tank 12. This induces stress in the friction weld 132, with such stress consisting essentially of tensile and shear stress. Therefore, the weld ring 130 is preferably formed of material which is comprised at least substantially of aluminum so that the weld ring 130, the neck 36, and the second plug part 62 are formed of similar materials. This helps to maximize the strength of the friction weld 132. Moreover, the fluid pressure in the storage chamber 16 presses the first and second plug parts 60 and 62 axially against each other. The stress induced in the corresponding friction weld 66 thus consists essentially of compressive stress. The dissimilar materials (steel and aluminum or an aluminum alloy) of the first and second plug parts 60 and 62 are securely fixed and sealed to each other by the friction weld 66 in this condition.

As shown in FIG. 1, the initiator assembly 50 has an elongated, two-part housing 140 extending longitudinally along the axis 32 of the tank 12. As shown in FIG. 2, one part 142 of the housing 140 is a tubular cylinder 142. The cylinder 142 contains a probe 144 and an electrically actuatable initiator 146. The other part 148 of the housing 140 is an adapter with a socket 150 for connection of the initiator 146 in an electrical circuit 152 (FIG. 3) in a vehicle. The adapter 148 is shaped to mate with radially and axially projecting flanges 154 and 156 on the cylinder 142. A tubular outer end wall 158 of the second plug part 62 is crimped radially and axially inward against the adapter 148. The outer end wall 158 presses the flange 154 on the cylinder 142 firmly against an annular inner shoulder surface 160 of the second plug part 62.

Figure 4:
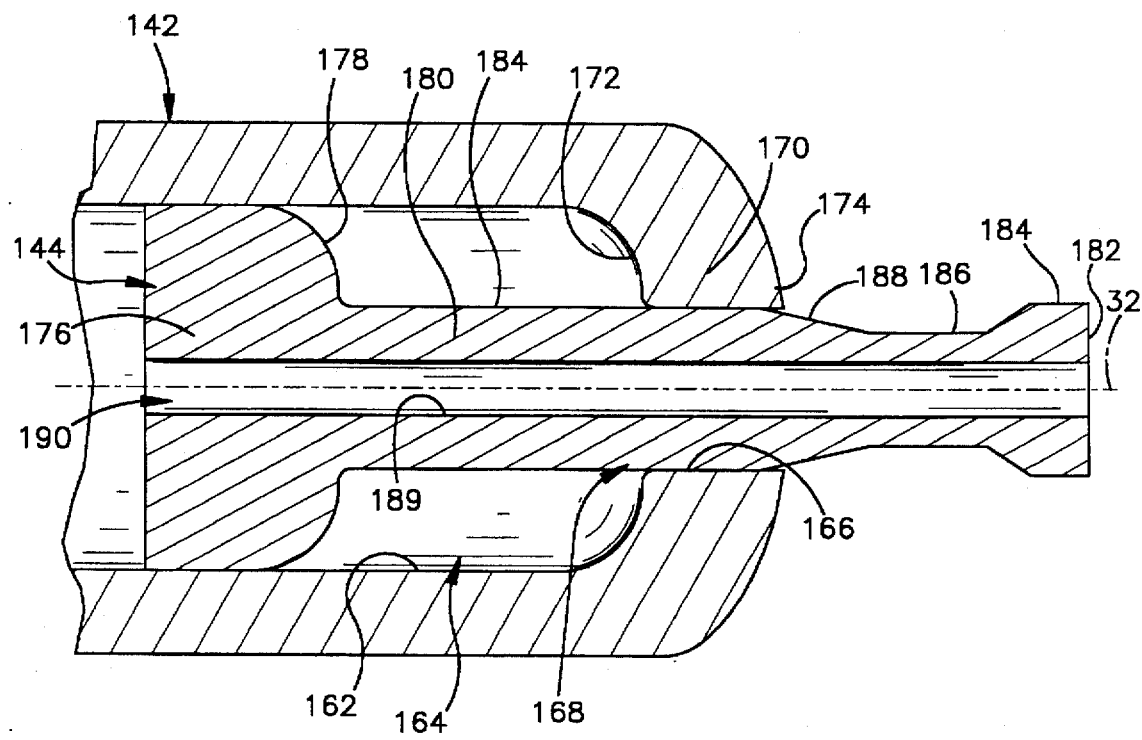
FIG. 4 is an enlarged partial view of parts shown in FIG. 2.

As shown partially in greater detail in FIG. 4, the cylinder 142 has a first cylindrical inner surface 162 defining a first bore 164. The first bore 164 is centered on the axis 32, and extends throughout the interior length of the cylinder. A second cylindrical inner surface 166 of the cylinder 142 defines a second, reduced diameter bore 168. The second bore 168 also is centered on the axis 32, and extends axially through an end wall 170 of the cylinder 142. An annular inner side surface 172 of the end wall 170 preferably has a concave contour. An oppositely facing, annular outer side surface 174 of the end wall 170 preferably has a convex contour.

The probe 144 has a short cylindrical base 176 received closely within the first bore 164 for sliding movement along the axis 32. An annular outer side surface 178 of the base 176 faces axially toward the inner side surface 172 of the end wall 170. The outer side surface 178 preferably has a convex contour.

The probe 144 further has a shaft 180 projecting axially from the base 176. The shaft 180 is received closely through the second bore 168, and has an annular end surface 182 in a plane perpendicular to the axis 32. A cylindrical peripheral surface 184 of the shaft 180 extends axially from the base 176 to the end surface 182. The peripheral surface 184 has a reduced diameter portion 186 which is spaced a short distance axially from the end surface 182. A tapered portion 188 of the peripheral surface 184 extends radially outward from the reduced diameter portion 186. A cylindrical inner surface 189 of the probe 144 defines a cylindrical passage 190 extending entirely through the probe 144 along the axis 32.

Referring again to FIG. 2, the initiator 146 has a cylindrical casing 192 containing a charge of pyrotechnic material. The pyrotechnic material may have any suitable composition known in the art, and is ignited in a known manner upon the passage of electric current through the initiator 146 between a pair of electrodes 194. The casing 192 fits closely within the first bore 164 in the cylinder 142, and is held in place by the adapter 148. The electrodes 194 project axially from the casing 192 and extend into the socket 150 in the adapter 148.

Figure 3:
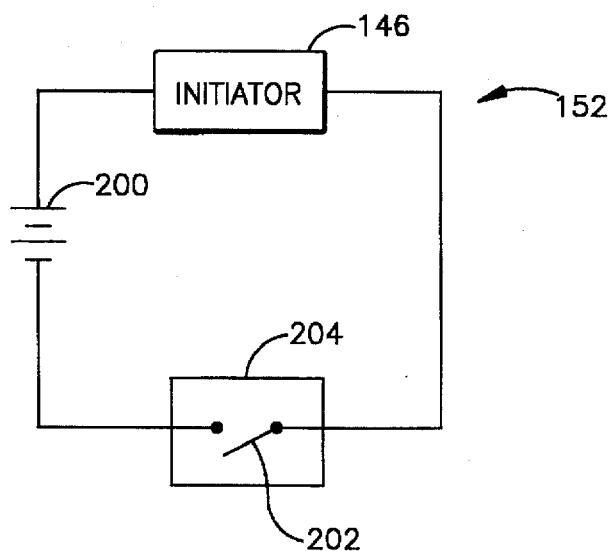
FIG. 3 is a schematic view of an electrical circuit including parts of the apparatus of FIG. 1.

As shown schematically in FIG. 3, the initiator 146 is connected in the electrical circuit 152 with a power source 200 and a normally open switch 202. The power source 200 is preferably the vehicle battery and/or a capacitor. The switch 202 is part of a collision sensor 204 which senses a vehicle condition indicating the occurrence of a collision. The collision-indicting condition may comprise, for example, sudden vehicle deceleration that is caused by a collision. If the collision-indicating condition is at or above a predetermined threshold level, it indicates the occurrence of a collision having at least a predetermined threshold level of severity. The threshold level of collision severity is a level at which inflation of the air bag is desired to help protect an occupant of the vehicle.

When the collision sensor 204 senses a collision-indicating condition at or above the predetermined threshold level, the switch 202 closes and electric current is directed through the initiator 146 between the electrodes 194. The pyrotechnic material in the casing 192 is then ignited and produces combustion products including heat, hot particles, and hot gases. The combustion products are spewed from the casing 192 into the first bore 164 adjacent to the base 176 of the probe 144.

Figure 5:
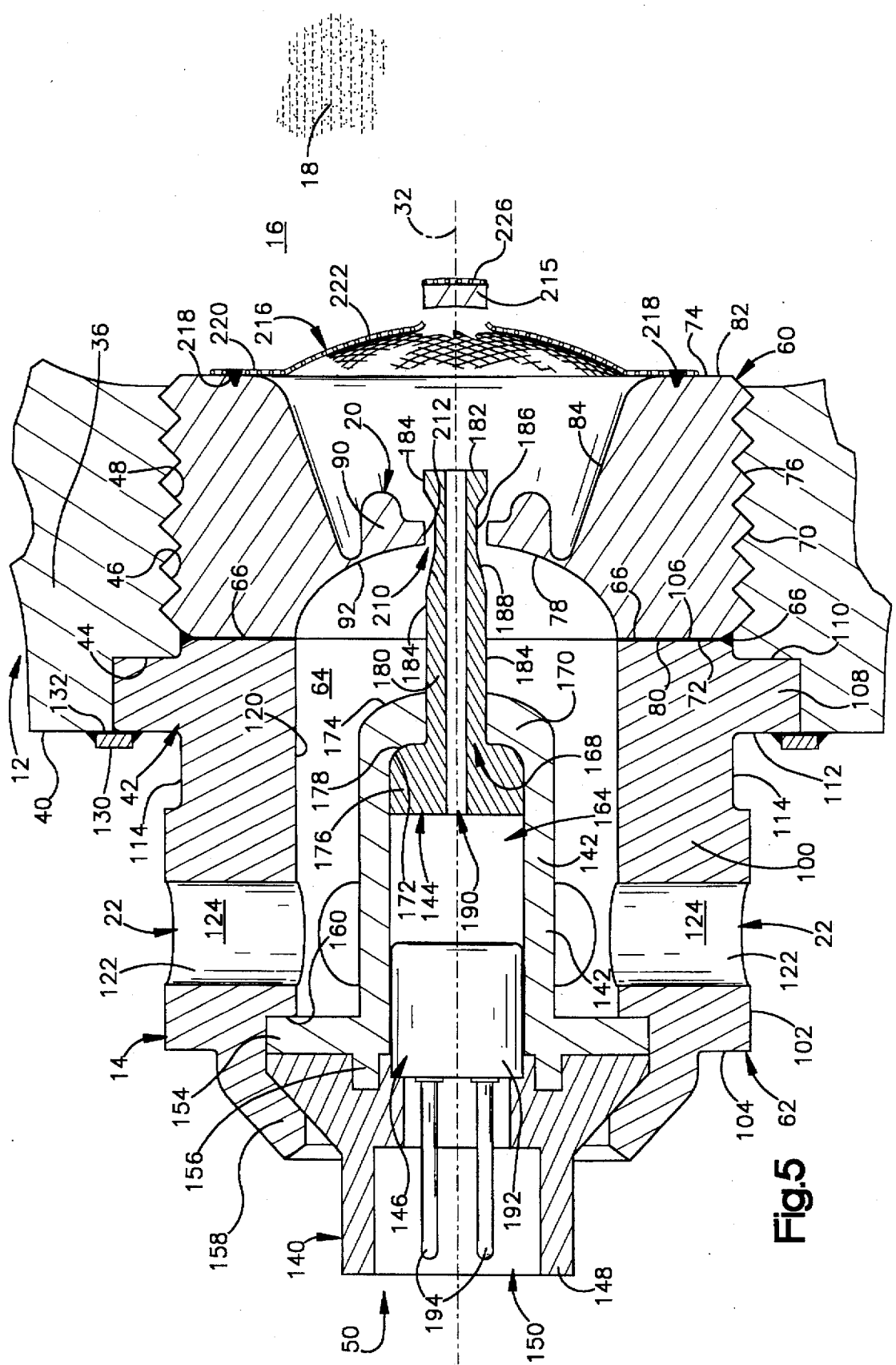
FIG. 5 is a view similar to FIG. 2 showing the apparatus in a partially actuated condition.

The combustion products spewed from the casing 192 develop a thrust which propels the probe 144 along the axis 32 from left to right, as viewed in the drawings. As the probe 144 approaches the position in which it is shown in FIG. 5, the shaft 180 of the probe 144 moves forcefully against and through the closure wall 20 so as to puncture an opening 210 through the center of the closure wall 20. As the probe 144 reaches the position of FIG. 5, the convex surface 178 of the probe 144 moves into abutting engagement with the concave surface 172 of the cylinder 142. The cylinder 142 thus functions as a stop member which stops the probe 144 in an actuated position in which the shaft 180 projects axially through the opening 210 in the closure wall 20.

The opening 210 in the closure wall 20 is a first outlet orifice through which the mixture of gases 18 begins to exit the storage chamber 16. The opening 210 has a circular shape defined by an annular inner edge surface 212 of the closure wall 20. The inner edge surface 212, and hence the opening 210, has a diameter which is substantially equal to the diameter of the peripheral surface 184 of the shaft 180 adjacent to the end surface 182 of the shaft 180. However, the reduced diameter portion 186 of the peripheral surface 184 extends through the opening 210 when the probe 144 is in the actuated position of FIG. 5. That portion 186 of the peripheral surface 184 is spaced radially from the inner edge surface 212 of the closure wall 20 so that the mixture of gases 18 can flow outward through the opening 210 between those surfaces.

Figure 6:
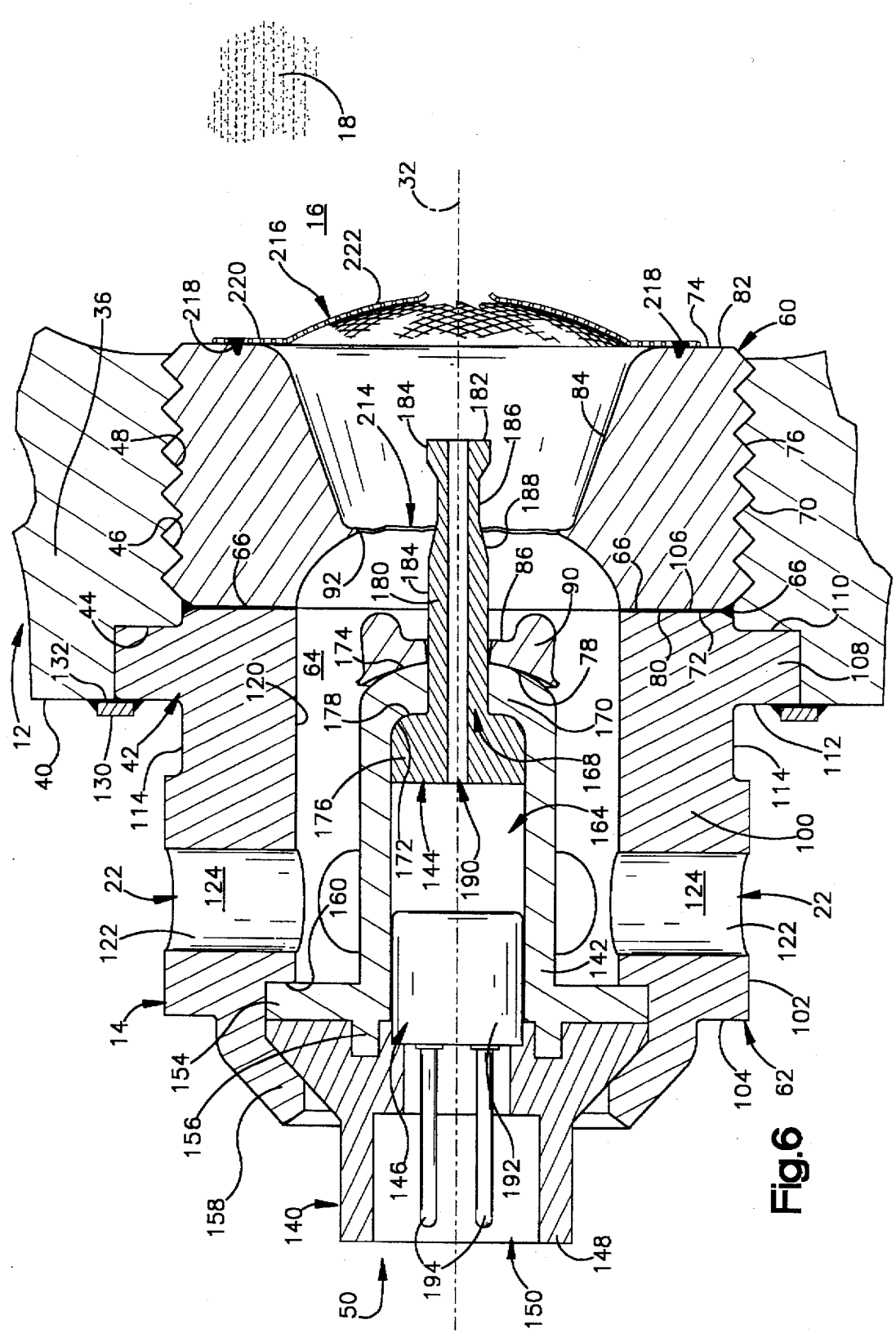
FIG. 6 is a view similar to FIGS. 2 and 5 showing the apparatus in a fully actuated condition.

The probe 144 conveys combustion products through the passage 190 from the first bore 164 to the storage chamber 16. Those combustion products ignite the combustible mixture of gases 18 in the storage chamber 16. This causes the fluid pressure in the storage chamber 16 to increase to the predetermined elevated level at which it ruptures the peripheral portion 92 of the closure wall 20. The breakaway portion 90 of the closure wall 20 is thus severed from the peripheral portion 92, as shown in FIG. 6, and is moved axially outward from the peripheral portion 92 into the conduit 64. A second, larger outlet orifice 214 is formed radially inward of the ruptured peripheral portion 92 of the closure wall 20. The mixture of gases 18 exits the storage chamber 16 through the second outlet orifice 214 at elevated flow rates corresponding to the elevated fluid pressure levels that are attained upon combustion in the storage chamber 16.

When the breakaway part 90 of the closure wall 20 is severed and moved away from the peripheral portion 92 in the foregoing manner, the probe 144 guides the breakaway part 90 to move axially to the position in which it is shown in FIG. 6. Specifically, the probe 144 is in the actuated position of FIG. 5 when the breakaway part 90 becomes severed from the peripheral portion 92. The shaft 180 of the probe 144 is then located in a position in which it engages and guides the breakaway part 90 to slide telescopically over the shaft 180 toward the end wall 170 of the cylinder 142. The tapered surface portion 188 of the shaft 180 guides the annular inner edge surface 212 of the breakaway part 90 to move telescopically onto the cylindrical surface portion 184 of the shaft 180 in a direction extending from right to left, as viewed in the drawings. The surface 212 then slides along the surface 184 as the breakaway part 90 moves axially toward the end wall 170. When the breakaway part 90 reaches the end wall 170, the concave surface 78 on the breakaway part 90 moves into abutting contact with the convex surface 174 on the end wall 170. The breakaway part 90 is thereafter held against the end wall 170 by the pressure of the gases 18 flowing outward through the conduit 64. In this manner, the probe 144 and the cylinder 142 function together to capture the breakaway part 90 at a predetermined location in the conduit 64 so that the breakaway part 90 cannot obstruct the flow of gases 18 moving outward through the conduit 64.

As further shown in FIG. 5, the probe 144 severs a small piece 215 of the closure wall 20 upon puncturing the opening 210 through the closure wall 20. A screen 216 is provided to block the severed piece 215 from moving outward through the second outlet orifice 214 with the mixture of gases 18. The screen 216 also is preferably formed of steel, and is most preferably formed of stainless steel.

A plurality of spot welds 218 fix a peripheral portion 220 of the screen 216 to the inner end surface 74 of the first plug part 60 at the peripheral portion 82 of the inner end surface 74. A central portion 222 of the screen 216 extends diametrically across the intermediate and central portions 84 and 86 of the inner end surface 74. In this arrangement, the screen 216 extends fully across the path taken by the mixture of gases 18 flowing outward from the storage chamber 16 through the first plug part 60.

The severed piece 215 of the closure wall 20 is propelled forcefully into the storage chamber 16 along the axis 32 such that it, in turn, punctures the screen 216 and severs a small piece 226 (FIG. 5) of the screen 216. The screen 216 subsequently blocks both of the severed pieces 215 and 226 from moving outward through the second outlet orifice 214 with the mixture of gases 18.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:

a tank;

a closure structure with a breakaway part exposed to fluid pressure in said tank, said breakaway part being severable from said closure structure for movement outward from said tank under the influence of elevated fluid pressure; and a probe which is movable forcefully against and through said closure structure so as to puncture a hole through said breakaway part, said probe comprising means for guiding said breakaway part to move outward from said tank telescopically over said probe under the influence of said elevated fluid pressure.

2. Apparatus as defined in claim 1 wherein said probe has a tapered peripheral surface portion for guiding said breakaway part to slide telescopically onto a cylindrical peripheral surface portion of said probe.

3. Apparatus as defined in claim 1 wherein said hole is defined by an inner edge surface of said breakaway part, said probe having a longitudinal central axis and a peripheral surface portion spaced radially from said inner edge surface of said breakaway part, said apparatus further comprising means for stopping said probe in an actuated position in which said peripheral surface portion of said probe extends axially through said hole.

4. Apparatus as defined in claim 1 further comprising means for stopping said breakaway part at a predetermined location outward of said tank.

5. Apparatus as defined in claim 4 wherein said probe has a longitudinal axis, said means for stopping said breakaway part having a first stop surface for stopping said breakaway part at said predetermined location and a second stop surface for stopping said probe in an actuated position, said first and second stop surfaces facing oppositely away from each other along said axis.

6. Apparatus as defined in claim 5 wherein said probe is supported for movement along said axis in a cylinder having an end wall, said first and second stop surfaces defining axially opposite sides of said end wall.

7. Apparatus comprising:

a tank containing combustible fluid under pressure;

an outlet structure defining a conduit for directing fluid outward from said tank;

a closure structure with a rupturable part and a breakaway part exposed to said pressure, said breakaway part being severable from said rupturable part and movable into said conduit under the influence of elevated fluid pressure; and an initiator assembly comprising an elongated probe and ignitable material which, when ignited, provides combustion products which propel said probe forcefully against and through said closure structure so as to puncture a hole through said breakaway part, said probe having an internal passage through which said combustion products are movable into said tank to ignite said combustible fluid;

said probe comprising means for supporting said breakaway part for sliding movement into said conduit telescopically over said probe under the influence of said elevated fluid pressure.

8. Apparatus as defined in claim 7 wherein said probe has a tapered peripheral surface portion for guiding said breakaway part to slide telescopically onto a cylindrical peripheral surface portion of said probe.

9. Apparatus as defined in claim 7 wherein said outlet structure and said closure structure are interconnected parts of a plug which closes said tank.

10. Apparatus as defined in claim 7 wherein said initiator assembly comprises a cylinder defining a bore through which said probe is movable along an axis under the influence of said combustion products, said cylinder having an outer surface facing axially toward said breakaway part, said outer surface comprising means for stopping said breakaway part upon movement of said breakaway part into contact with said outer surface.

11. Apparatus as defined in claim 10 wherein said cylinder further has an inner surface comprising means for stopping said probe in an actuated position in which said probe extends through said hole.

* * * * *